(12) United States Patent
Mas Rosique et al.

(10) Patent No.: US 11,039,381 B2
(45) Date of Patent: Jun. 15, 2021

(54) SMF SELECTION BASED ON SUPPORTED DNN

(71) Applicant: Telefonaktiebolaget LM Ericsson (publ), Stockholm (SE)

(72) Inventors: Maria Luisa Mas Rosique, Tres Canto (ES); Göran Hall, Mölndal (SE); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/492,663

(22) PCT Filed: Mar. 15, 2018

(86) PCT No.: PCT/EP2018/056539
§ 371 (c)(1),
(2) Date: Sep. 10, 2019

(87) PCT Pub. No.: WO2018/172182
PCT Pub. Date: Sep. 27, 2018

(65) Prior Publication Data
US 2020/0053636 A1    Feb. 13, 2020

Related U.S. Application Data

(60) Provisional application No. 62/474,344, filed on Mar. 21, 2017.

(51) Int. Cl.
*H04W 48/16* (2009.01)
*H04W 76/25* (2018.01)
(Continued)

(52) U.S. Cl.
CPC .......... *H04W 48/16* (2013.01); *H04M 15/66* (2013.01); *H04W 8/08* (2013.01); *H04W 48/18* (2013.01); *H04W 76/25* (2018.02); *H04W 80/10* (2013.01)

(58) Field of Classification Search
CPC ..... H04M 15/66; H04W 48/16; H04W 48/18; H04W 76/12; H04W 76/25; H04W 80/10; H04W 8/08
See application file for complete search history.

(56) References Cited

U.S. PATENT DOCUMENTS

2019/0222489 A1\* 7/2019 Shan .................... H04L 12/1407
2019/0364458 A1\* 11/2019 Zhou ................. H04W 36/0055
2020/0092934 A1\* 3/2020 Dou ...................... H04W 76/12

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.3.1, Mar. 1, 2017, pp. 1-97, 3GPP.

(Continued)

*Primary Examiner* — Stephen J Clawson
(74) *Attorney, Agent, or Firm* — Coats + Bennett, PLLC

(57) ABSTRACT

There are provided methods, arrangements and entities for an Access and mobility Function, AMF, and for a NF Repository Function, NRF in a 5G supporting Communication Network, CN, providing services to a User Entity. Also, a NF Repository Function, NRF, is described. A request (2A) for SMF information to the NRF to retrieve at least a list of SMFs that supports the DNN and optionally which network slices each SMF supports is transmitted.

10 Claims, 7 Drawing Sheets

(51) Int. Cl.
    *H04M 15/00*    (2006.01)
    *H04W 8/08*     (2009.01)
    *H04W 48/18*    (2009.01)
    *H04W 80/10*    (2009.01)

(56) References Cited

OTHER PUBLICATIONS

Ericsson et al., "23.501: SMF Selection", SA WG2 Meeting #118BIS, Spokane, USA, Jan. 16, 2017, pp. 1-3, S2-170679, 3GPP.
Motorola Mobility et al., "23.501: UE Traffic Routing", SA WG2 Meeting #119, Dubrovnik, Croatia, Feb. 13, 2017, pp. 1-7, S2-171528, 3GPP.
3rd Generation Partnership Project, "3rd Generation Partnership Project; Technical Specification Group Services and System Aspects; Study on Architecture for Next Generation System (Release 14)", Technical Report, 3GPP TR 23.799 V14.0.0, Dec. 1, 2016, pp. 1-522, 3GPP.
3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.2.0, Feb. 1, 2017, pp. 1-71, 3GPP.
ETSI, "Network Functions Virtualisation (NFV); Architectural Framework", Group Specification, ETSI GS NFV 002 V1.1.1, Oct. 1, 2013, pp. 1-21, ETSI.

* cited by examiner

FIG. 1 – PRIOR ART

SMF SELECTION BASED ON SUPPORTED DNN

TECHNICAL FIELD

This invention is directed to aspects of 5G core network systems, entities and methods.

BACKGROUND

In Evolved Packet Core, EPC, the selection of a Packet Data Network Gateway, PGW is done in Mobility Management Entity, MME by resolving the selected Access Point Name, APN, or possibly a decorated APN through sending the Fully Qualified Domain Name, FQDN, created based on the APN to a Domain Name System, DNS, server. The DNS server resolves the APN FQDN and sends back a list of PGWs and corresponding network address (IP address). The DNS server may also provide the PGW host names.

The MME selects the PGW from the received list based on local criteria including which SGW that was previously selected. Also, internally kept black lists of PGWs and simple load balancing mechanisms etc. are used. The PGW selection is done based on the requested APN, possibly with some added requests for location, charging characteristics, co-location with Serving Gateway, SGW, etc.

In the 5G work in 3GPP it has been agreed to do a further split between Mobility Management, MM, and Session Management, SM, compared to in EPC where MME supports both MM and some SM functionality. The Access and Mobility Function, AMF, supports MM functionality and the Session Management Function, SMF, supports SM functionality. The agreed reference architecture is shown in the FIG. 1.

In the 5G architecture it has been agreed that the AMF selects the SMF. Different SMFs may be selected for different PDU Sessions of a UE, e.g. PDU Sessions to different Data Network Names (DNNs)/APNs, or the same SMF may be used.

A network slice is a complete logical network that comprises of a set of network functions and corresponding resources necessary to provide certain network capabilities and network characteristics. It includes both 5G-AN and 5G CN. A Network Slice Instance, NSI, is the Instantiation of a Network Slice, i.e. a deployed set of network functions delivering the intended Network Slice Services according to a Network Slice Template. Each slice may be used for a e.g. a certain category of users such as either mobile broadband or Internet of Things devices.

SUMMARY

One object of the invention is to enhance the adaptation of a User Entities, UE's, needs when it comes to SMF selection.

In 5G CN there is a new network entity called NRF, NF Repository Function, that is used to assist in Network Function (NF) Selection e.g. SMF selection. The AMF queries the NRF to get a list of IP addresses or FQDN supporting the Data Network, DN Name (APN) and possibly slice that the UE is to access. The NRF may later in standardization turn out to be implemented through a DNS but it is not yet decided whether DNS is used or NRF is working according to some other solution.

According to an aspect of the invention, the NRF to not only respond to the requesting AMF which SMFs that support the requested DN (APN) and (optionally) slice, but also to include in the response per SMF which other DNs (APNs) and (optionally) slices it also supports.

The AMF can then, based on knowledge from subscription data including subscribed DNs (APNs), or possibly through input from the UE of possible future DNs (and possibly slices) to connect to, select the SMF that have the best match of DNs (all or most DNs) that a UE may connect to. In case an SMF is common to multiple network slices, the AMF could also consider selecting an SMF that serves the slices that the UE is allowed to connect to. This selection is in its simplest form done just through matching the subscribed DNs (APNs) with the list of supported DNs from each SMF and which SMF gives the most matches is selected by the AMF for the particular UE.

This object has been accomplished by a method for an Access and mobility Function, AMF interworking with a NF Repository Function, NRF in a 5G supporting Communication Network, CN, providing services to a User Entity, UE, the CN potentially being constituted by a number of network slices, the CN comprising a control plane comprising the Access Mobility Function, AMF, a Session Management Function, SMF, and a user plane comprising a Radio Access Network, RAN, a User Plane Function, UPF, and a Data Network, DN, each DN being denoted by a DN name, DNN. The method comprises the AMF upon receiving (1) a Network, Access Stratum, NAS, message from a UE;
- determining that the NAS message corresponds to a request for a new Packet Data Unit, PDU, Session involving a specific DNN;
- sending a request for SMF information to the NRF to retrieve at least a list of SMFs that supports the DNN and optionally which possible network slices each SMF supports, wherein the request for SMF information comprises a request to retrieve a list of extended information of further DNNs, and optionally further possible network slices, supported by said further SMFs of said list.

This object has also been accomplished by a Method for a Network Function Repository Function, NRF, in a 5G supporting Communication Network, CN, providing services to a User Entity, the CN potentially being constituted by a number of network slices, the CN comprising a control plane comprising an Access Mobility Function, AMF, and a Session Management Function, SMF, a user plane comprising a Radio Access Network, RAN, a User Plane Function, UPF, and a Data Network Name, DNN. The NRF upon receiving a request for SMF information from a AMF to retrieve at least a list of SMFs that supports the DNN and a network slice,
- replying with a response comprising
  - one or more SMFs serving the DNN, and optionally network slice
    - information about further DNNs, and possibly network slices, that are supported by the SMF, or
  - an optimized match of Access and mobility Function, AMF SMF and network slices, selecting a SMF that can support a PDU session.

There is also provided a computer program and a computer program product.

A corresponding Access and mobility Function, AMF apparatus and a corresponding Network Function Repository Function, NRF, apparatus are provided.

Further advantages of the invention will appear from the following detailed description of the invention.

DETAILED DESCRIPTION

Today the PGW selection is done only based on the requested APN, possibly with some added requests for location, Charging characteristics, co-location with SGW, dedicated Core Network instance etc. But the selection does not take into account other future APNs that the UE/subscriber subscribes to and may connect to at a later stage.

Thus, when a second APN is set up the PGW selection for that is separate from the first one. And for EPC that may be OK as the SGW anyway is in common for a UE with multiple APNs, but in 5G CN there is no common SM-related point between different APNs/DNs. If different SMFs are used there will thus be multiple N11 reference points for a UE. The AMF would need to notify some or all SMFs of a UE e.g. at Service Request procedures, handover etc. It is thus a benefit from a signalling point of view to select one and the same SMF for multiple DNs (APNs), as this will allow piggybacking of information over N11 on a single message, instead of using different SMFs, and thus multiple N11 reference points, with separate messages. If SMF selection is however done based on same principles in EPC, where AMF only considers the DNN/APN of the PDU Session that is to be established, the SMF selection is done independent of DNNs/APNs that may be established later.

Figure 1:
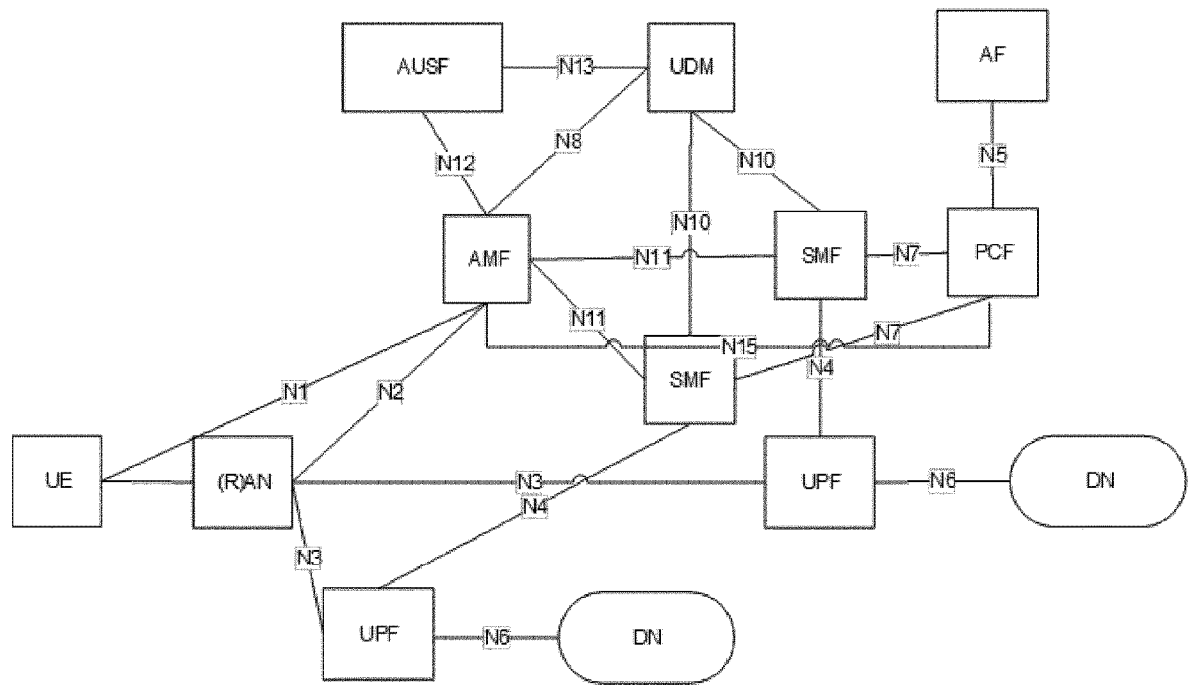
FIG. 1 shows a prior system architecture of a 5G communication network.
Figure 2:
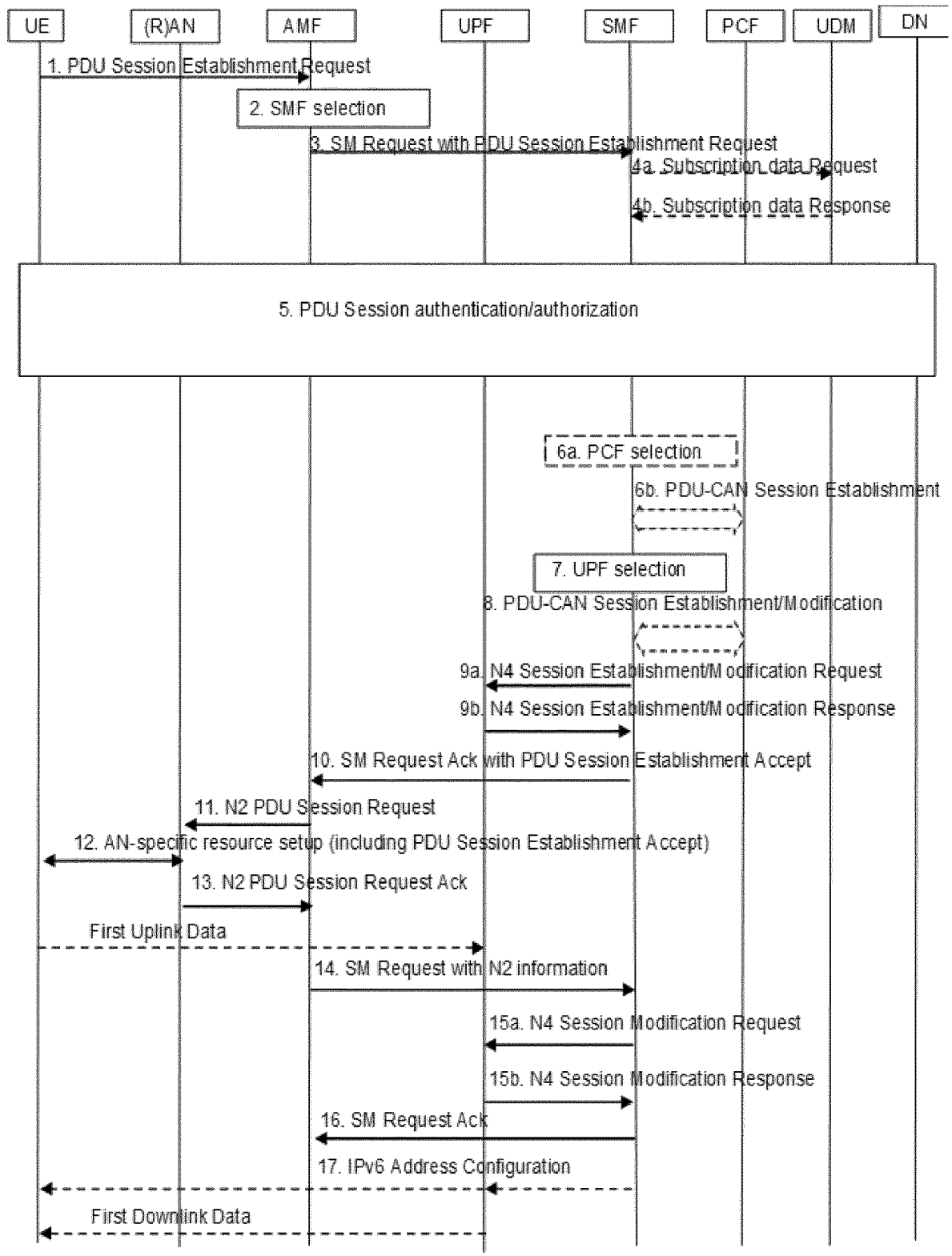
FIG. 2 shows a UE requested PDU session establishment procedure known in the art.
Figure 4:
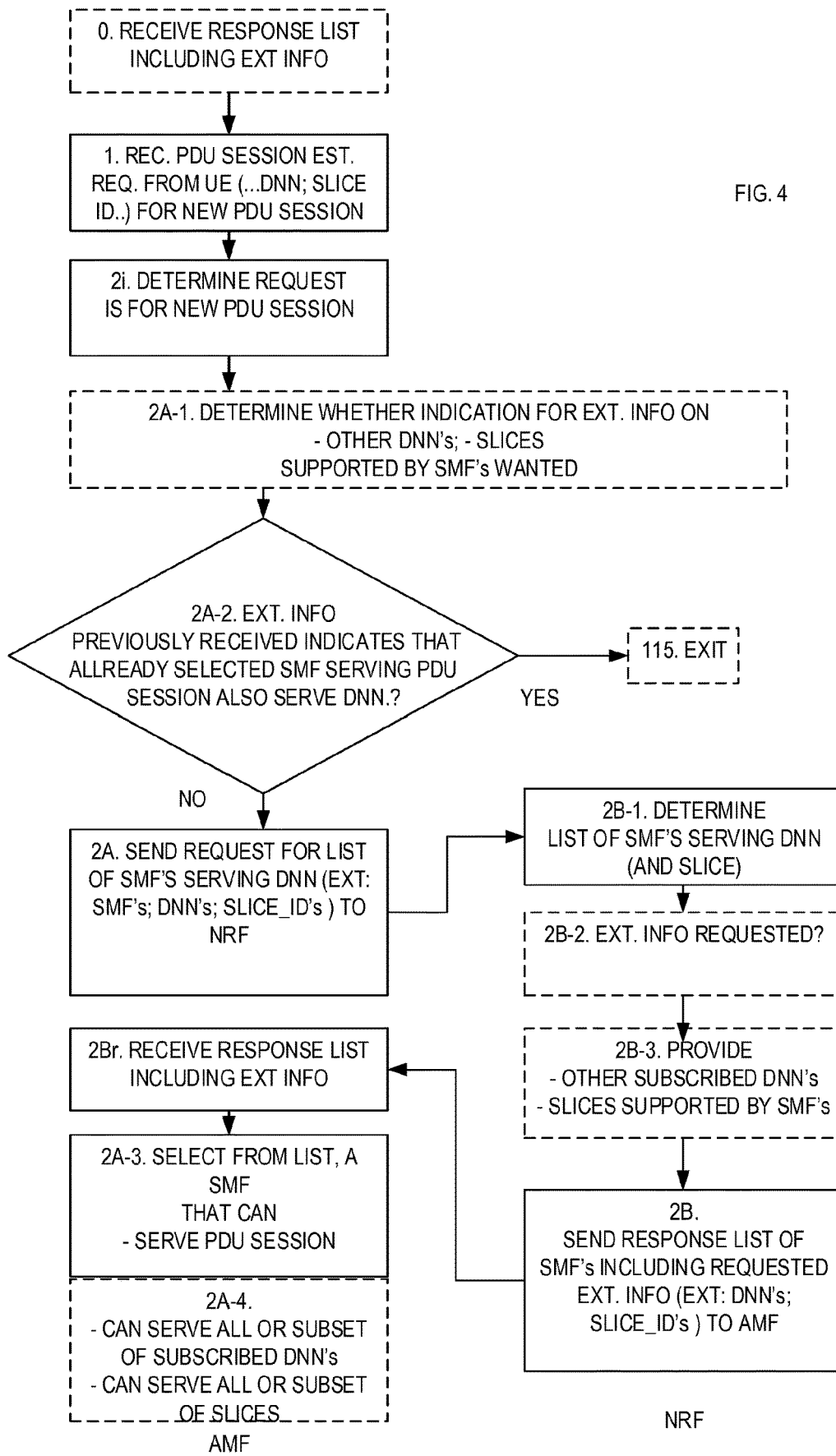
FIG. 4 is a flow diagram of an embodiment of a method according to the invention.

According to an aspect of the invention, a call flow uses the PDU Session Establishment call flow corresponding to FIG. 4.3.2.2-1-13 of 3GPP TS 23.502 V0.2.0 (hereinafter referred to 23.502). In FIG. 2, this call flow has been replicated.

The step for SMF selection (step 2) has been expanded, and the NRF has been added, compared to the version included in 23.502 in order to describe further details of the invention.

The procedure assumes that the UE has already registered on the AMF thus the AMF has already retrieved the user subscription data from the Unified Data Management, UDM, including a list of subscribed DNNs (and slices).

Embodiments of the invention will now be described with reference to FIGS. 3 and 4.

0. Initially, the AMF may receive a response list including extended information about SMF's (c.f. 2A-1).

1. From UE to AMF: NAS Message (S-NSSAI, DNN, PDU Session ID, SM information), PDU session establishment request.

2i. The AMF determines that the message corresponds to a request for a new PDU Session based on the PDU Session ID that is not used for any existing PDU Session(s) of the UE. The AMF may utilize the NRF to retrieve a list of SMFs that supports the DNN and possibly slice corresponding for this PDU Session for SMF selection.

2A. Concerning SMF selection, the AMF sends a request to the NRF to retrieve a list of SMFs that supports the DNN and possibly slice corresponding for this PDU Session. The AMF provides the selected Data Network Name (DNN) and possible the selected Slice ID (e.g. S-NSSAI) to the NRF.

2A-1 According to an embodiment of the invention: The AMF may indicate in the request that it wants extended information about the SMFs, including information about other DNNs, and possibly network slices, supported by the SMFs.

2B. The NRF replies with a message that contains one or more identities of SMFs serving the DNN and slice. The identities may be either IP address(es), or FQDNs or both.

2B-2. 2B-3. According to an embodiment of the invention: If extended information is requested by AMF in step 2A-1, the reply from the NRF also contains information about which other DNNs, and possibly slices, that are supported by the SMF. The NRF may also decide to provide this information even if there is no explicit request in step 2A for the extended information.

2A-3. The AMF selects an SMF to support this PDU Session out of the SMF identities provided by NRF.

2A-4. According to an embodiment of the invention: The AMF may take the list of subscribed DNNs (and network slices) into account when selecting and SMF, in order to select an SMF that not only supports the DNN (and slice) of the PDU Session being established currently, but that can support all or a subset of the subscribed DNNs (and slices). For example, if an SMF, based on the extended information from NRF, supports several of the DNNs (and network slices) allowed in the UE subscription, AMF may prefer to select this SMF over an SMF that only supports a single or fewer subscribed DNNs/network slices. The AMF may also take other selection criteria and information into account, such as e.g. DNNs and SMF IDs preconfigured on the AMF (e.g. for emergency services).

2A-2. According to an embodiment of the invention: In case the AMF has received extended information at a previous PDU Session Establishment procedure (c.f. 0 above), and that extended information indicated that an already selected SMF serving an existing PDU Session also can support the DNN (and network slice) of a further PDU Session according to an embodiment of the invention, the request to the NRF in step 2A may be skipped and the AMF may select the same SMF also for this further PDU Session.

Then follows known steps from 3GPP TS 23.502 V. 0.2.0 (2017-02): FIG. 4.3.2.2.1-1. UE-requested PDU Session Establishment for non-roaming and roaming with local breakout that is illustrated in FIG. 2:

3. From AMF to SMF: SM Request (Permanent User ID, DNN, S-NSSAI, PDU Session ID, AMF ID, SM NAS information, User location information, AT Type)

4a. SMF request SM-level subscription data from UDM

4b. UDM to SMF: Subscription Data Response.

5. PDU session authentication/authorization 6a-6b. If dynamic PCC is deployed, the SMF performs PCF selection and may initiate session establishment towards PCF 7. The SMF also selects an UPF 8. Interactions with PCF may take place 9a-9b. The SMF performs an N4 Session Establishment procedure with the selected UPF:

10. SMF to AMF: SM Request Ack (N2 SM information (PDU Session ID, QoS Profile, CN Tunnel Info), N1 SM Container (PDU Session Establishment Accept (Authorized QoS Rule, SSC mode))) to the AMF.

11. AMF to (R)AN: N2 PDU Session Request (N2 information received from SMF in DL N2 Transfer Information Request, NAS message).

12. (R)AN to UE: The (R)AN may issue AN specific signalling exchange with the UE that is related with the information received from SMF.

13. (R)AN to AMF: N2 PDU Session Request Ack ((R)AN tunnel info).

14. AMF to SMF: SM Request (N2 SM information).

15a-15b. If the N4 session for this PDU Session was not established already, the SMF initiates an N4 Session Establishment procedure with the UPF. Otherwise, the SMF initiates an N4 Session Modification procedure with the UPF.

16. The AMF stores an association of the PDU Session and SMF ID for this PDU Session for this UE.

17. SMF to UE, via UPF: In case of PDU Type IPv6, the SMF generates an IPv6 Router Advertisement and sends it to the UE via N4 and the UPF.

Figure 5:
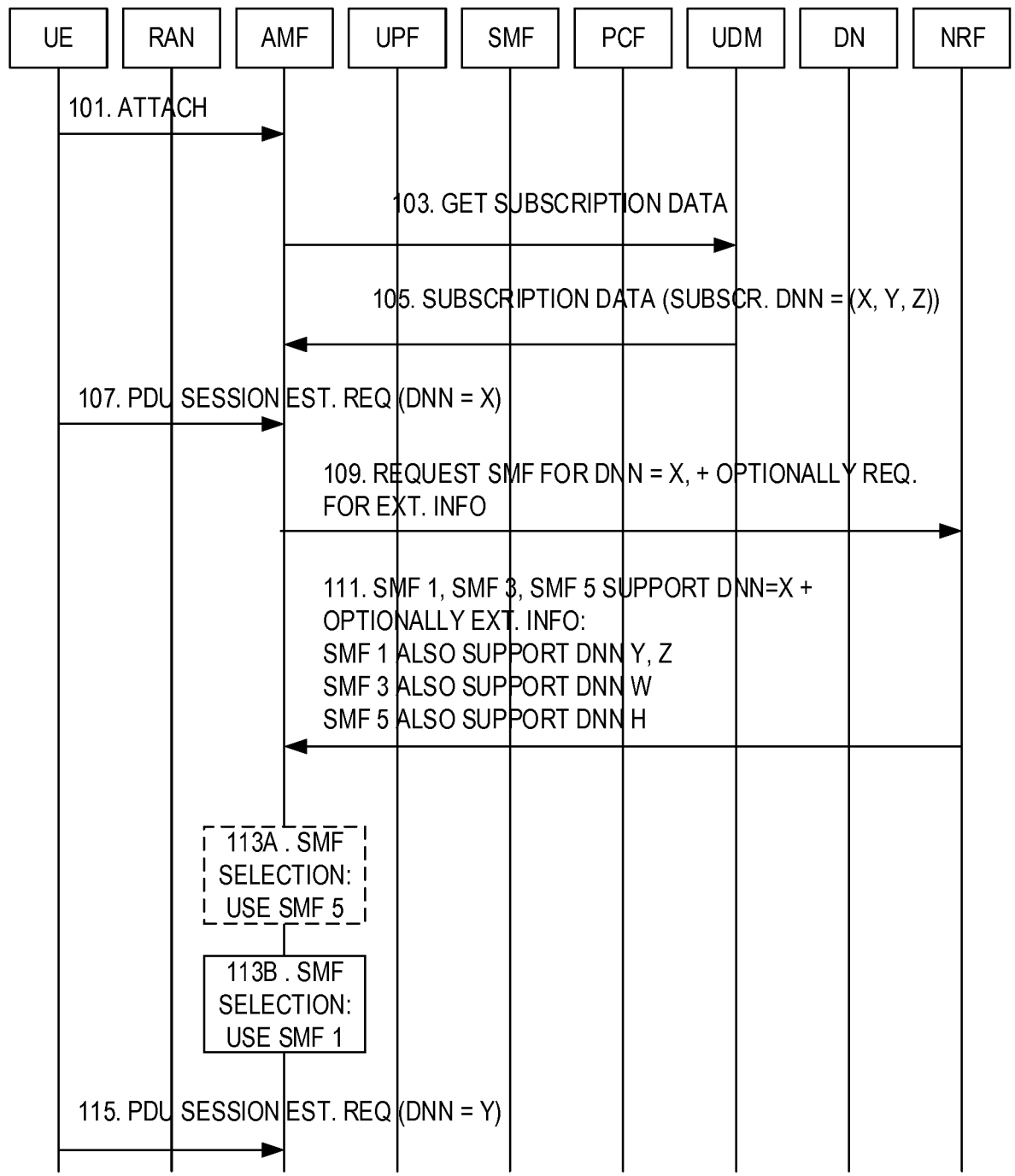
FIG. 5 shows an exemplary scenario for data according to embodiments of the invention.

In FIG. 5, an exemplary scenario of an embodiment according to the invention is shown, illustrating some of the features explained above.

It is imagined that at least SMF's 1, 3 and 5 exist and that DNN's X, Y, Z, W and H exist in the exemplary scenario.

It should be noted that a UE may subscribe to a DNN. This may involve that a UE has a right to use a DNN. A PDU may be supported by SMF. This means that a SMF can handle a PDU session for a UE with a given DNN.

In step 101, the UE transmits an attach message to the AMF.

In step 103, the AMF issues a get subscription data message to the UDM, which relies in 105 with the requested subscription data, that by way of example, corresponds to DNN X, DNN Y, DNN Z.

Figure 3:
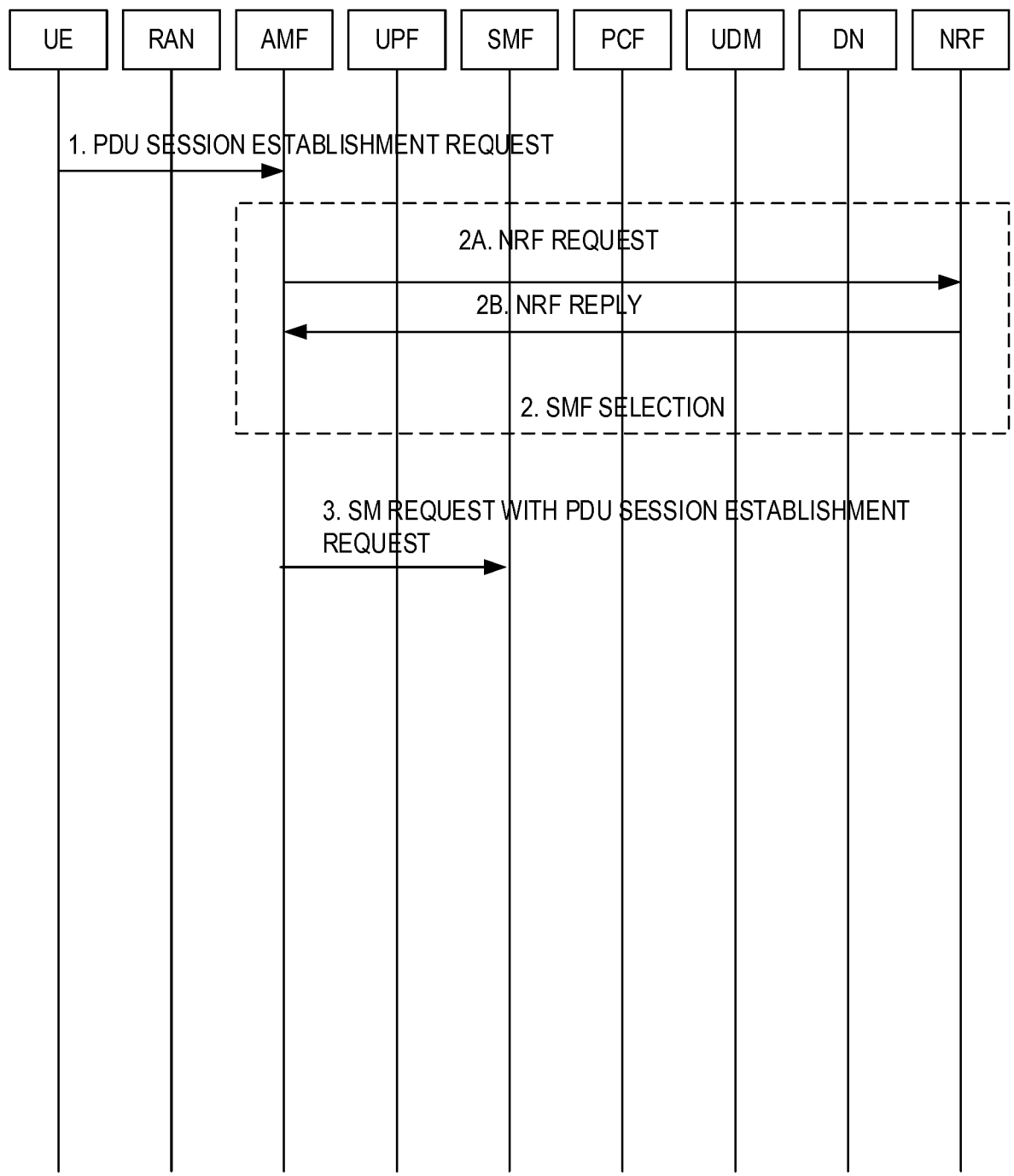
FIG. 3 shows an embodiment of a method according to the invention.

In step 107, a PDU session request is issued—corresponding to step 1 in FIGS. 2 and 3—to the AMF.

The AMF in turn, step 109, issues a request to the NRF for SMF information comprising the particular SMF for DNN X and optionally extended information. 109 corresponds to 2A above in FIG. 3.

In step 111, corresponding to 2B in FIG. 3, a response is received in the AMF from the NRF comprising the requested information, namely in this case a list of SMF 1, SMF 3, SMF 5 that all support DNN X. Additionally and optionally, extended information is comprised in the response: SMF 1 also supports DNN Y and DNN Z. SMF 3 also supports DNN W. SMF 5 also supports DNN H.

The AMF may now undertake a selection of the SMF. One option is to select 113A SMF 5 since it supports DNN X which reflects the requirements of the PDU session establishment request 107.

The AMF may however advantageously take into consideration the extended information and select SMF 1 in step 113B, which SMF also supports DNN Y and DNN Z.

Should a further PDU session request be received for a further DNN such as DNN Y for the UE, the choice of SMF is optimized. One and the same SMF can handle the PDU sessions. This is an advantage concerning signalling especially in view of possible handover scenarios.

Figure 6:
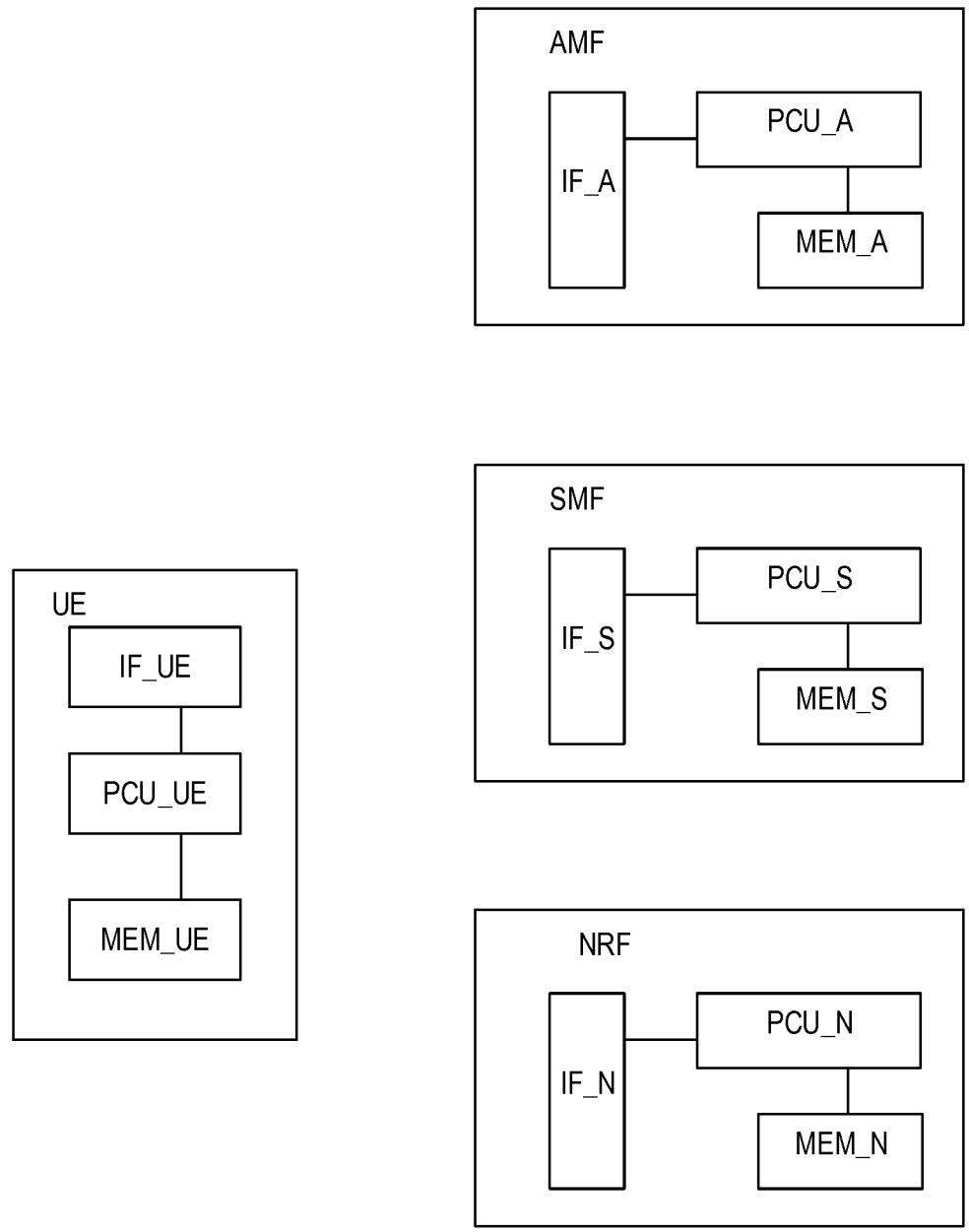
FIG. 6 shows embodiments of a UE, a AMF entity, a SMF entity, and a NRF entity according to embodiments of the invention.

In FIG. 6, there is shown a user equipment, UE, apparatus according to embodiments of the invention.

The UE comprises processing means comprising a processor PCU_UE an interface IF_UE and a memory, MEM_UE, in which memory instructions are stored and a processor PRC_UE for carrying out the method steps explained above. The UE communicates via the interface IF_UE. The IF_UE comprises both an external interface, communicating with a transmitter and receiver, and internal interfaces (not shown).

In FIG. 6, there is moreover shown a AMF comprising processing means comprising a processor PCU_A, an interface IF_A; and a memory, MEM_A. Instructions are stored in the memory for being performed by the processor such that the method steps explained above are carried out and signalling is communicated on the interface.

A SMF is also shown comprising processing means comprising a processor PCU_S, an interface IF_S; and a memory, MEM_S. Instructions are stored in the memory for being performed by the processor such that the method steps explained above are carried out and signalling is communicated on the interface.

Finally, a NRF comprising processing means comprising a processor PCU_N an interface IF_N; and a memory, MEM_N is shown. Instructions are stored in the memory for being performed by the processor such that the method steps explained above are carried out and such that corresponding signalling is effectuated on the interface.

The respective processors PCU_UE, PCU_A, PCU_S and PCU_N may be a combination of one or more of a microprocessor, controller, micro-controller, central processing unit, digital signal processor, application specific integrated circuit, field programmable gate array, or any other suitable computing device, resource, or combination of hardware, software and/or encoded logic operable to provide, either alone or in conjunction with other network node components, such as storage, network node functionality. Respective Storages MEM_UE, MEM_A, MEM_S and MEM_N may comprise any form of volatile or non-volatile computer readable memory including, without limitation, persistent storage, solid state memory, remotely mounted memory, magnetic media, optical media, random access memory, RAM, read-only memory, ROM, removable media, or any other suitable local or remote memory component.

As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. The wireless device may support device-to-device, D2D, communication, for example by implementing a 3GPP standard for side-link communication and may in this case be referred to as a D2D communication device. As yet another specific example, in an Internet of Things, IoT, scenario, a wireless device may represent a machine or other device that performs monitoring and/or measurements and transmits the results of such monitoring and/or measurements to another wireless device and/or a network node. The wireless device may in this case be a machine-to-machine, M2M, device, which may in a 3GPP context be referred to as a machine-type communication, MTC, device. As one particular example, the wireless device may be a UE implementing the 3GPP narrow band internet of things, NB-IoT, standard.

Alternative embodiments of UE may include additional components beyond those shown in FIG. 6 that may be responsible for providing certain aspects of the UE's functionality, including any of the functionality described herein and/or any functionality necessary to support the solution described above.

Figure 7:
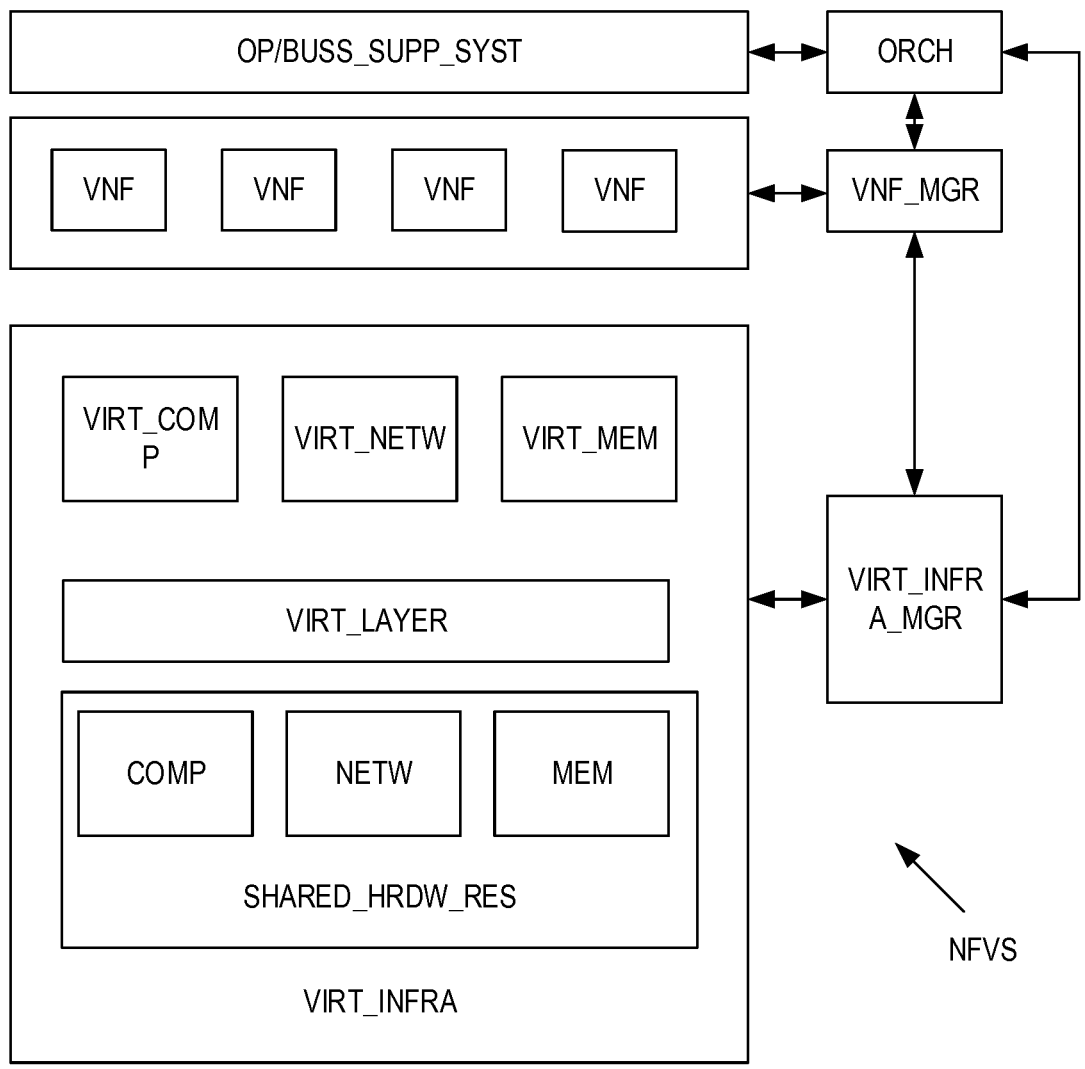
FIG. 7 shows an implementation constituted by network functions virtualization.

The methods discussed above may alternatively be implemented by means of a system based on network functions virtualization. In FIG. 7, further embodiments of the invention are implemented by means of such a network function virtualization system, NFVS, formed on e.g. general-purpose servers, standard storage and switches. The NFVS may be arranged along the lines described in FIG. 4, ETSI GS NFV 002 V. 1.1.1 (2013-10) and comprises the following elements: A NFV management and orchestration system comprising an Orchestrator, ORCH, a VNF manager, VNF_MGR, and a virtualised Infrastructure manager, VIRT_INFRA. The NFVS moreover comprises an operational/business support system, OP/BUSS_SUPP_SYST, a number of virtual network function instances, VNF, by which the method steps explained above are instantiated, and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, comprising e.g. standard switches and other network devices, and standard data storage devices, MEM.

There is moreover provided at least one computer program or computer program product according to the invention. The program or computer program product may be adapted to run on any of the processor or processors above and the tasks of the computer program or computer program product may be further adapted to be carried out by various program modules undertaking functions and sub-functions of the computer program or computer program product as defined in the various method steps indicated above.

To summarize, there is provided:

A Method for an Access and mobility Function, AMF interworking with a NF Repository Function, NRF in a 5G supporting Communication Network, CN, providing services to a User Entity, UE, the CN potentially being constituted by a number of network slices, the CN comprising a a control plane comprising the Access Mobility Function, AMF, a Session Management Function, SMF, and a user plane comprising a Radio Access Network, RAN, a User Plane Function, UPF, and a Data Network, DN, each DN being denoted by a DN name, DNN, the method comprising the AMF upon receiving 1 a Network, Access Stratum, NAS, message from a UE;
  determining 2i that the NAS message corresponds to a request for a new Packet Data Unit, PDU, Session involving a specific DNN;
  sending a request 2A for SMF information to the NRF to retrieve at least a list of SMFs that supports the DNN and optionally which possible network slices each SMF supports, wherein the request for SMF information 2A comprises a request to retrieve a list of extended information of further DNNs, and optionally further possible network slices, supported by said further SMFs of said list.

Upon the AMF receiving from the NRF a response 2Br with a list of SMFs that supports the requested DNN and a network slice, the response 2Br optionally comprising extended information of further supported DNNs, and optionally further possible network slices, supported by said further SMFs of said list, the AMF
  selecting 2A-3 from the list of SMF's a SMF that can support the new PDU session.

The selection of the SMF may involve a SMF that can at least one of
  support an optimized subset of subscribed DNN's,
  support an optimized subset of network slices.

The optimized subset of subscribed DNN's may be aiming at maximizing the number of subscribed DNN's or all possible viable subscribed DNN's; and the optimized subset of network slices is aiming at maximizing the number of network slices or all possible viable network slices.

The selection of SMF may also involve selecting a SMF that is preconfigured for the AMF.

If a second request for a PDU session involving a second requested DNN is received, the AMF may perform
  determining 2A-2 if the second requested DNN is already supported by the selected SMF, and if so,
  refraining 115 from sending a request for a list of SMF's, and if not,
  sending 2A a request for a list of SMF's serving the second requested DNN.

There is provided a Method for a Network Function Repository Function, NRF, in a 5G supporting Communication Network, CN, providing services to a User Entity, the CN potentially being constituted by a number of network slices, the CN comprising
  a control plane comprising an Access Mobility Function, AMF, and a Session Management Function, SMF,
  a user plane comprising a Radio Access Network, RAN, a User Plane Function, UPF, and a Data Network Name, DNN, in which the NRF, upon receiving 2Br a request for SMF information from a AMF to retrieve at least a list of SMFs that supports the DNN and a network slice,
    replying with a response 2B comprising
    one or more SMFs serving the DNN, and optionally network slice
      information about further DNNs, and possibly network slices, that are supported by the SMF, or
    an optimized match of SMF and network slices,
    selecting 2A-3 a SMF that can support a PDU session.

The control plane may moreover comprise a Policy Control Function, PCF, and an Application Function, AF.

There is provided a computer program or computer program comprising instructions for when run on a processor carrying out any of methods according to claims 1-8.

There is also provided an Access and mobility Function, AMF, interworking with a Network Repository Function, NRF, in a 5G supporting Communication Network, CN, providing services to a User Entity, UE, the CN potentially being constituted by a number of network slices. The CN comprising a control plane comprising the Access Mobility Function, AMF, a Session Management Function, SMF, Packet Data Unit, and a user plane comprising a Radio Access Network, RAN, a User Plane Function, UPF, and a Data Network, DN, each DN being denoted by a DN name, DNN, comprising the AMF upon receiving 1 a Network Access Stratum, NAS, message from a UE; the AMF comprising processing means PCU-A being adapted for
  determining 2i that the NAS message corresponds to a request for a new Packet Data Unit, PDU, Session involving a requested DNN;
  sending a request 2A for SMF information to the NRF to retrieve at least a list of SMFs that supports the DNN and optionally which possible network slices each SMF supports, wherein the request for SMF information 2A comprises a request to retrieve a list of extended information of further DNNs, and optionally further possible network slices, supported by said further SMFs of said list.

Upon the AMF receiving from the NRF a response 2Br with a list of SMFs that supports the requested DNN and a network slice, the response 2Br optionally comprises extended information of further supported DNNs, and optionally further possible network slices, supported by said further SMFs of said list, the AMF may
  selecting 2 from the list of SMF's a SMF.

The selection of the SMF may involve a SMF that can at least one of
support an optimized subset of subscribed DNN's,
support an optimized subset of network slices.

An optimized subset of subscribed DNN's may be aiming at maximizing the number of subscribed DNN's or all possible viable subscribed DNN's; and an optimized subset of network slices is aiming at maximizing the number of network slices or all possible viable network slices.

The selection of SMF may also involve selecting a SMF that is preconfigured for the AMF.

For the AMF, if a second request for a PDU session involving a second requested DNN is received, the AMF may be
determining 2A-2 if the second requested DNN is already supported by the selected SMF, and if so,
refraining 115 from sending a request for a list of SMF's, and if not,
sending 2A a request for a list of SMF's serving the second requested DNN.

For the AMF the processing means may comprise a processor PCU_A, an interface IF_A; and a memory, MEM_A.

There is provided a Network Function Repository Function, NRF, in a 5G supporting Communication Network, CN, providing services to a User Entity, the CN potentially being constituted by a number of network slices, the CN comprising a control plane comprising an Access Mobility Function, AMF, and a Session Management Function, SMF, a user plane comprising a Radio Access Network, RAN, a User Plane Function, UPF, and a Data Network Name, DNN. The NRF
upon receiving 2Br a request for SMF information from a AMF to retrieve at least a list of SMFs that supports the DNN and a network slice, is
replying with a response 2B comprising
one or more SMFs serving the DNN, and optionally network slice
information about further DNNs, and possibly network slices, that are supported by the SMF, or
an optimized match of SMF and network slices,
selecting 2A-3a SMF that can support a PDU session.

The Network Function Repository Function, NRF, also comprises processing means comprising a processor PCU_N an interface IF_N; and a memory, MEM_N.

Further Embodiments

Method for an Access and mobility Function, AMF interworking with a NF Repository Function, NRF in a 5G supporting Communication Network, CN, providing services to a User Entity, UE, the CN potentially being constituted by a number of network slices, the CN comprising a control plane comprising the Access Mobility Function, AMF, a Session Management Function, SMF, and a user plane comprising a Radio Access Network, RAN, a User Plane Function, UPF, and a Data Network, DN, each DN being denoted by a DN name, DNN, comprising, the AMF upon receiving (1) a NAS message from a UE;
determining (2i) that the message corresponds to a request for a new PDU Session
sending a request (2A) for SMF information to the NRF to retrieve at least a list of SMFs that supports the DNN and optionally which slices each SMF supports.

The request for SMF information (2A) may comprise a request to retrieve a list of extended information of further supported DNNs, and optionally further possible slices, supported by said further SMFs of said list.

The method may moreover comprise, upon the AMF receiving from the NRF a response (2Br) with a list of SMFs that supports the DNN and a slice, the response (2Br) optionally comprising extended information of further supported DNNs, and optionally further possible slices, supported by said further SMFs of said list, the AMF
selecting (2) from the list of SMFs' a SMF that can at least one of
support an optimized subset of subscribed DNN's,
support an optimized subset of slices.

An optimized subset of subscribed DNN's may be constituted by a maximum number of subscribed DNN's or all possible viable subscribed DNN's; and an optimized subset of slices is constituted by a maximum number of slices or all possible viable slices.

A method for a NF Repository Function, NRF in a 5G supporting Communication Network, CN, providing services to a User Entity, the CN potentially being constituted by a number of network slices, the CN comprising a control plane comprising an Access Mobility Function, AMF, and a Session Management Function, SMF, a user plane comprising a Radio Access Network, RAN, a User Plane Function, UPF, and a Data Network Name, DNN, the NRF upon receiving (2Br) a request for SMF information from a AMF to retrieve at least a list of SMFs that supports the DNN and a network slice, —replying with a response (2B) comprising—one or more identities of SMFs serving the DNN, and optionally—network slice, —information about what other DNNs, and possibly network slices, are supported by the SMF identity, or—an optimized match of SMF identities and network slices, selecting (2A-3) a SMF that can support a PDU session.

The control plane may moreover comprise a Policy Control Function, PCF, and an Application Function, AF.

The invention claimed is:
1. A method for operating an Access Mobility Function (AMF) interworking with a Network Repository Function (NRF) in a 5G supporting Communication Network (CN) providing services to a User Entity (UE), wherein the CN comprises a control plane comprising the AMF and a Session Management Function (SMF), a user plane comprising a Radio Access Network (RAN), a User Plane Function (UPF), and at least one Data Network (DN), each DN being denoted by a DN name (DNN), the method comprising the AMF;
upon receiving a Network Access Stratum (NAS) message from a UE:
determining that the NAS message corresponds to a request for a new Packet Data Unit (PDU) Session involving a specific DNN;
sending a request for SMF information to the NRF to retrieve at least a list of SMFs that supports the DNN, wherein the request for SMF information comprises a request to retrieve a list of extended information of further DNNs;
upon receiving, from the NRF, a response with the list of SMFs that support the requested DNN and a network slice, selecting, from the list of SMFs, a SMF that can support the new PDU session; and
wherein, if a second request for a PDU session involving a second requested DNN is received, the AMF:
determining if the second requested DNN is already supported by the selected SMF;

refraining, if the second requested DNN is already supported by the selected SMF, from sending a request for a list of SMFs; and sending, if the second requested DNN is not already supported by the selected SMF, a request for a list of SMFs serving the second requested DNN.

2. The method of claim 1, wherein the selection of the SMF involves a SMF that can:

support an optimized subset of subscribed DNNs; and/or support an optimized subset of network slices.

3. The method of claim 2:

wherein the optimized subset of subscribed DNNs maximizes the number of subscribed DNNs or all possible viable subscribed DNNs; and wherein the optimized subset of network slices maximizes the number of network slices or all possible viable network slices.

4. The method of claim 2, wherein the selection of SMF comprises selecting a SMF that is configured for the AMF.

5. The method of claim 1, wherein the control plane further comprises a Policy Control Function (PCF) and an Application Function (AF).

6. An Access Mobility Function (AMF) interworking with a Network Repository Function (NRF) in a 5G supporting Communication Network (CN) providing services to a User Entity (UE), wherein the CN comprises a control plane comprising the AMF and a Session Management Function (SMF), a user plane comprising a Radio Access Network (RAN), a User Plane Function (UPF), and at least one Data Network (DN), each DN being denoted by a DN name (DNN), the AMF comprising:

processing circuitry; and memory containing instructions executable by the processing circuitry whereby the AMF is operative to:

upon receiving a Network Access Stratum (NAS) message from a UE:

determine that the NAS message corresponds to a request for a new Packet Data Unit (PDU) Session involving a requested DNN; and send a request for SMF information to the NRF to retrieve at least a list of SMFs that supports the DNN, wherein the request for SMF information comprises a request to retrieve a list of extended information of further DNNs;

in response to receiving a second request for a PDU session involving a second requested DNN:

determine if the second requested DNN is already supported by the selected SMF;

refrain, if the second requested DNN is already supported by the selected SMF, from sending a request for a list of SMFs; and send, if the second requested DNN is not already supported by the selected SMF, a request for a list of SMFs serving the second requested DNN.

7. The AMF of claim 6, wherein the instructions are such that the AMF is operative to, upon receiving, from the NRF, a response with a list of SMFs that support the requested DNN and a network slice, selects a SMF from the list of SMFs.

8. The AMF of claim 7, wherein the selection of the SMF involves a SMF that can:

support an optimized subset of subscribed DNNs; and/or support an optimized subset of network slices.

9. The AMF of claim 8:

wherein the optimized subset of subscribed DNNs maximizes the number of subscribed DNNs or all possible viable subscribed DNNs; and wherein the optimized subset of network slices maximizes the number of network slices or all possible viable network slices.

10. The AMF of claim 8, wherein the selection of SMF comprises selecting a SMF that is configured for the AMF.

\* \* \* \* \*